(12) United States Patent
Salmon

(10) Patent No.: US 9,703,321 B2
(45) Date of Patent: Jul. 11, 2017

(54) SNAP ON WEARABLE MODULE

(71) Applicant: I-BLADES, INC., Milpitas, CA (US)

(72) Inventor: Peter C. Salmon, Mountain View, CA (US)

(73) Assignee: I-BLADES, INC., Milpitas, CA (US)

( * ) Notice: Subject to any disclaimer, the term of this patent is extended or adjusted under 35 U.S.C. 154(b) by 0 days.

(21) Appl. No.: 14/327,551

(22) Filed: Jul. 9, 2014

(65) Prior Publication Data

US 2015/0072731 A1  Mar. 12, 2015

Related U.S. Application Data

(60) Provisional application No. 61/844,006, filed on Jul. 9, 2013.

(51) Int. Cl.
*H04B 1/38* (2015.01)
*G06F 1/16* (2006.01)
(Continued)

(52) U.S. Cl.
CPC ............ *G06F 1/163* (2013.01); *G06F 1/1632* (2013.01); *G06F 1/1654* (2013.01);
(Continued)

(58) Field of Classification Search
CPC ...... Y10T 24/32; Y10T 292/11; G06F 1/1675; G06F 1/1637; G06F 1/1654; G06F 1/163;
(Continued)

(56) References Cited

U.S. PATENT DOCUMENTS

| 3,786,391 A | 1/1974 | Mathauser |
| 3,810,258 A | 5/1974 | Mathauser et al. |

(Continued)

FOREIGN PATENT DOCUMENTS

| CN | 101275711 A | 10/2008 |
| CN | 201562205 U | 8/2010 |

(Continued)

OTHER PUBLICATIONS

U.S. Appl. No. 14/017,000, "Final Office Action", Jun. 26, 2015, 7 pages.

(Continued)

*Primary Examiner* — Don N Vo
(74) *Attorney, Agent, or Firm* — Kilpatrick Townsend & Stockton LLP

(57) ABSTRACT

An electronic device comprises a wearable docking station containing magnets. A releasable module having matching magnets attaches to the docking station and may be programmed to respond to email or other messages arriving over a BLUETOOTH or other wireless connection to a mobile device. User alerts may also be provided as programmed images on the face of the module. The releasable module may be serviced using a direct physical connection between the module and a servicing device, the servicing device provided with a matching set of magnets, possibly embedded in a protective cover of a user's mobile device. As examples, servicing may comprise charging the module, syncing the module with the mobile device, transferring data, or establishing or amending a trusted pair relationship between the mobile device and the module.

16 Claims, 5 Drawing Sheets

(51) Int. Cl.
*H04M 1/725* (2006.01)
*H04M 1/04* (2006.01)
*H04B 1/3827* (2015.01)

(52) U.S. Cl.
CPC ... *H04M 1/7253* (2013.01); *H04B 2001/3861* (2013.01); *H04M 1/04* (2013.01); *H04M 2250/02* (2013.01)

(58) Field of Classification Search
CPC .......... H04B 1/3888; A63B 2071/0663; A63B 2225/50
USPC ....................................................... 455/557
See application file for complete search history.

(56) References Cited

U.S. PATENT DOCUMENTS

| | | | |
|---|---|---|---|
| 4,390,232 A | 6/1983 | Jamgotchian et al. | |
| 4,479,685 A | 10/1984 | Kirby et al. | |
| 4,966,556 A | 10/1990 | Sorrentino et al. | |
| 5,295,494 A * | 3/1994 | Rodriguez | A61N 2/06 128/845 |
| 5,347,428 A | 9/1994 | Carson et al. | |
| 5,642,265 A | 6/1997 | Bond et al. | |
| 5,829,987 A | 11/1998 | Fritsch et al. | |
| 5,917,709 A | 6/1999 | Johnson et al. | |
| 5,921,783 A | 7/1999 | Fritsch et al. | |
| 5,923,526 A | 7/1999 | Kangas et al. | |
| 5,986,887 A | 11/1999 | Smith et al. | |
| 6,137,164 A | 10/2000 | Yew et al. | |
| 6,144,888 A | 11/2000 | Lucas et al. | |
| 6,420,953 B1 | 7/2002 | Dadafshar et al. | |
| 6,619,835 B2 * | 9/2003 | Kita | A44C 5/0015 368/10 |
| 6,628,531 B2 | 9/2003 | Dadafshar et al. | |
| 6,871,047 B2 | 3/2005 | Iwata | |
| 6,910,911 B2 | 6/2005 | Mellott et al. | |
| 6,958,531 B2 | 10/2005 | Ucok et al. | |
| 7,145,179 B2 | 12/2006 | Petroski | |
| 7,252,512 B2 | 8/2007 | Tai et al. | |
| 7,311,526 B2 | 12/2007 | Rohrbach et al. | |
| 7,329,128 B1 | 2/2008 | Awad | |
| 7,331,793 B2 | 2/2008 | Hernandez et al. | |
| 7,341,458 B1 | 3/2008 | Koh | |
| 7,344,379 B2 | 3/2008 | Marmaropoulos et al. | |
| 7,344,380 B2 | 3/2008 | Neidlein et al. | |
| 7,348,785 B2 | 3/2008 | Maxwell | |
| 7,467,948 B2 | 12/2008 | Lindberg et al. | |
| 7,579,683 B1 | 8/2009 | Falik et al. | |
| 7,641,476 B2 | 1/2010 | Didur et al. | |
| 7,658,613 B1 | 2/2010 | Griffin et al. | |
| 7,719,098 B2 | 5/2010 | Wehrly et al. | |
| 7,758,349 B2 | 7/2010 | Han et al. | |
| 7,885,685 B2 | 2/2011 | Himmelstein | |
| 7,942,678 B2 | 5/2011 | Sanford et al. | |
| 8,094,458 B2 | 1/2012 | Furnival et al. | |
| 8,138,869 B1 | 3/2012 | Lauder et al. | |
| 8,185,155 B2 | 5/2012 | Chang et al. | |
| 8,242,868 B2 | 8/2012 | Lauder et al. | |
| 8,262,403 B2 | 9/2012 | Slippy et al. | |
| 8,266,793 B2 | 9/2012 | Lotfi et al. | |
| 8,348,678 B2 | 1/2013 | Hardisty et al. | |
| 8,390,412 B2 | 3/2013 | Lauder et al. | |
| 8,395,901 B2 | 3/2013 | Tour et al. | |
| 8,435,042 B2 | 5/2013 | Rohrbach et al. | |
| 8,442,581 B2 | 5/2013 | Chung et al. | |
| 8,454,372 B2 | 6/2013 | Lee et al. | |
| 8,498,124 B1 | 7/2013 | Berry et al. | |
| 8,529,247 B2 | 9/2013 | Poe et al. | |
| 8,690,582 B2 | 4/2014 | Rohrbach et al. | |
| 8,798,675 B2 | 8/2014 | Salmon et al. | |
| 9,064,356 B2 | 6/2015 | Salmon et al. | |
| 2001/0043514 A1 | 11/2001 | Kita et al. | |
| 2004/0022026 A1 | 2/2004 | Belady et al. | |
| 2007/0099603 A1 | 5/2007 | Castres et al. | |
| 2008/0029147 A1 | 2/2008 | Yang et al. | |
| 2008/0150132 A1 | 6/2008 | Hu et al. | |
| 2009/0150547 A1 | 6/2009 | Tripathi | |
| 2009/0212637 A1 | 8/2009 | Baarman et al. | |
| 2009/0214051 A1 | 8/2009 | Lockett et al. | |
| 2010/0164671 A1 | 7/2010 | Pagani et al. | |
| 2010/0292599 A1 * | 11/2010 | Oleson | A63B 24/0062 600/519 |
| 2011/0092081 A1 | 4/2011 | Gao et al. | |
| 2011/0114377 A1 | 5/2011 | Brun et al. | |
| 2011/0192857 A1 | 8/2011 | Rothbaum et al. | |
| 2012/0143062 A1 | 6/2012 | Nordgren et al. | |
| 2012/0178270 A1 | 7/2012 | McElroy et al. | |
| 2012/0201068 A1 | 8/2012 | Ware et al. | |
| 2012/0218211 A1 | 8/2012 | McRae et al. | |
| 2012/0301730 A1 | 11/2012 | Yagi et al. | |
| 2013/0050958 A1 | 2/2013 | Bdeir et al. | |
| 2014/0065847 A1 | 3/2014 | Salmon et al. | |
| 2014/0066128 A1 | 3/2014 | Salmon et al. | |
| 2014/0213319 A1 * | 7/2014 | Gibbons | H04R 1/08 455/557 |
| 2014/0240085 A1 | 8/2014 | Salmon et al. | |
| 2014/0296651 A1 * | 10/2014 | Stone | A61B 5/6804 600/301 |
| 2014/0349257 A1 * | 11/2014 | Connor | G09B 19/0092 434/127 |
| 2015/0199858 A1 | 7/2015 | Salmon et al. | |

FOREIGN PATENT DOCUMENTS

| | | |
|---|---|---|
| CN | 102017353 A | 4/2011 |
| CN | 102625966 A | 8/2012 |
| CN | 202888505 U | 4/2013 |
| CN | 104854760 | 8/2015 |
| EP | 2893595 A2 | 7/2015 |
| HK | 1209237 | 3/2016 |
| JP | 2015529382 | 10/2015 |
| WO | 03090321 A1 | 10/2003 |
| WO | 2010099168 A1 | 9/2010 |
| WO | 2012030228 A1 | 3/2012 |
| WO | 2013106284 A2 | 7/2013 |
| WO | 2014036558 A2 | 3/2014 |
| WO | 2014036558 A3 | 4/2014 |

OTHER PUBLICATIONS

U.S. Appl. No. 14/017,000, "Final Office Action", Mar. 31, 2016, 7 pages.
U.S. Appl. No. 14/017,000, "Final Office Action", Sep. 29, 2014, 7 pages.
U.S. Appl. No. 14/017,000, "Non Final Office Action", May 23, 2014, 8 pages.
U.S. Appl. No. 14/017,000, "Non-Final Office Action", Jan. 29, 2015, 6 pages.
U.S. Appl. No. 14/017,000, "Non-Final Office Action", Nov. 19, 2015, 9 pages.
U.S. Appl. No. 14/017,000, "Response to Restriction Requirement", May 6, 2014, 1 page.
U.S. Appl. No. 14/017,000, "Restriction Requirement", Feb. 14, 2014, 7 pages.
U.S. Appl. No. 14/017,040, "Notice of Allowance", Feb. 6, 2014, 9 pages.
U.S. Appl. No. 14/017,040, "Response to Restriction Requirement", Dec. 10, 2013, 1 page.
U.S. Appl. No. 14/017,040, "Restriction Requirement", Dec. 3, 2013, 8 pages.
U.S. Appl. No. 14/017,040, filed Sep. 3, 2013.
U.S. Appl. No. 14/271,376, "Corrected Notice of Allowance", May 20, 2015, 2 pages.
U.S. Appl. No. 14/271,376, "Non Final Office Action", Aug. 27, 2014, 7 pages.
U.S. Appl. No. 14/271,376, "Notice of Allowance", Dec. 24, 2014, 7 pages.
U.S. Appl. No. 14/271,376, "Restriction Requirement", Aug. 13, 2014, 7 pages.

(56) References Cited

OTHER PUBLICATIONS

EP13832043.7, "Extended European Search Report", Jul. 7, 2016, 9 pages.
PCT/US2013/057846, "International Preliminary Report on Patentability", Mar. 12, 2015, 12 pages.
PCT/US2013/057846, "International Search Report and Written Opinion Received", Feb. 6, 2014, 13 pages.
U.S. Appl. No. 14/017,000, "Notice of Allowance", Oct. 11, 2016, 9 pages.
U.S. Appl. No. 14/017,000, "Supplemental Notice of Allowance", Nov. 8, 2016, 2 pages.
CN201380051785.9, "Office Action", Sep. 5, 2016, 8 pages.
U.S. Appl. No. 14/671,169, "Notice of Allowance", May 10, 2017, 5 pages.
CN201380051785.9, "Office Action", May 10, 2017, 3 pages.

* cited by examiner

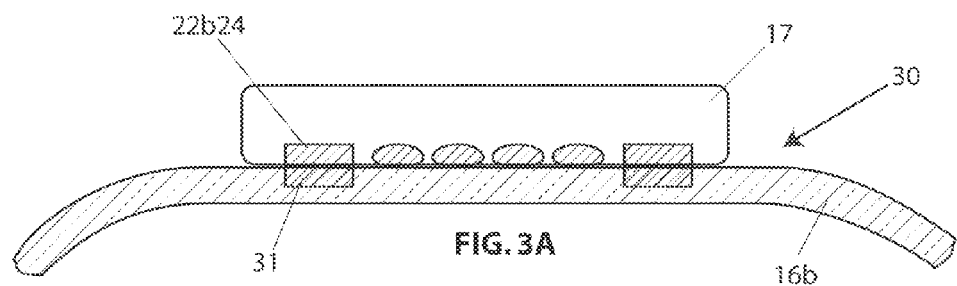
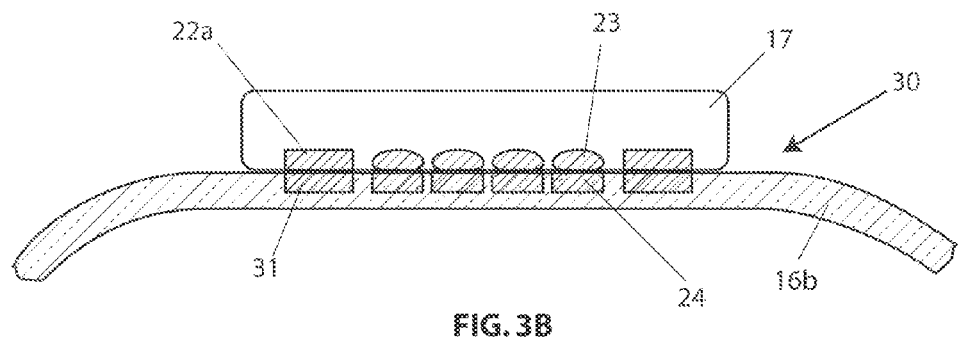

SNAP ON WEARABLE MODULE

TECHNICAL FIELD

This invention relates to devices that are worn by a user, and more particularly to releasable modules that snap on and snap off a wearable docking station at a user's convenience.

BACKGROUND

Smart watches such as the PEBBLE have been introduced. Such a watch may link to a smart phone via a wireless connection such as BLUETOOTH. It may have many uses such as: showing caller ID for a phone message arriving at the smart phone; viewing and sending email and SMS; social messaging using FACEBOOK and TWITTER; and receiving calendar and weather alerts.

The smart watch typically requires servicing, including syncing with a mobile device and periodic charging. There is a need in the art for improved apparatus and methods relating to attaching a releasable module to a user's person, and servicing the wearable device in a convenient manner.

SUMMARY OF THE INVENTION

A wearable device comprising: a band attachable to a user; a base attachable to the band wherein the base comprises attachment magnets. The wearable device further includes a detachable module comprising: a first set of module magnets having spatial orientation corresponding to the attachment magnets of the base and disposed on a first face of the detachable module; a first set of compliant terminals disposed on the first face of the detachable module; a processor; a memory coupled to the processor wherein the memory is encoded with instructions that are executable by the processor to interpret received communication signals, generate sent communication signals, and generate related alerts to a user; and, a transceiver for receiving the received communication signals and sending the sent communication signals. The wearable device may comprise a display for displaying content of display signals, and the memory coupled to the processor will preferably be encoded with instructions for providing the display signals. The display will typically be disposed on a second face of the wearable module, the second face opposing the first face. The band attachable to the user and the base attachable to the band may be combined in a single docking component comprising attachment magnets. The periphery of the wearable device defines a device area, and a periphery of the detachable module defines a module area, and the module area is independent of the device area.

A stacked wearable device includes a band attachable to a user, a base attachable to the band wherein the base comprises attachment magnets, and first and second detachable modules. The first detachable module comprises a first set of module magnets having spatial orientation corresponding to the attachment magnets of the base and disposed on a first face of the first detachable module; a second set of module magnets having spatial orientation corresponding to the attachment magnets of the base and disposed on a second face of the first detachable module opposing the first face of the first detachable module; a first set of compliant terminals disposed on the first face of the first detachable module; a second set of terminals having spatial orientation corresponding to the first set of compliant terminals and disposed on the second face of the first detachable module; a processor; a memory coupled to the processor wherein the memory is encoded with instructions that are executable by the processor; and, optionally a transceiver for receiving and sending communication signals.

The second detachable module is stackable with the first detachable module and comprises: a third set of module magnets having spatial orientation corresponding to the attachment magnets of the base and disposed on the first face of the second detachable module; a third set of compliant electrical terminals having spatial orientation corresponding to the first set of compliant terminals of the first detachable module and disposed on the first face of the second detachable module; a second processor; a second memory coupled to the second processor wherein the second memory is encoded with instructions that are executable by the processor to provide display signals; and, a display for displaying content of the display signals.

A method for organizing a user's electronic equipment comprising: providing a docking station wearable by the user; attaching a releasable module to the docking station; providing wireless communications between a mobile device of the user and the releasable module; acting on wireless communications passing between the mobile device of the user and the releasable module; and, periodically servicing the releasable module by separating it from the docking station and attaching it to a secondary device for service operations, then reattaching it to the docking station for continued operations. The secondary device may comprise a secondary mobile device. The service operations may comprise charging the releasable module, syncing the releasable module with the mobile device of the user, establishing or amending a trusted pair relationship between the mobile device of the user and the releasable module, or transferring data between the mobile device of the user and the releasable module. The docking station may comprise magnets for coupling devices together. The attaching of the releasable module to the mobile device may comprise: bringing the devices together with matching faces in proximate alignment, then snapping the components together using the magnetic attraction force.

BRIEF DESCRIPTION OF THE DRAWINGS

FIG. 3A is an expanded cross-sectional view showing an alternative arrangement for attaching the wearable device to the band.

FIG. 3B is an expanded cross-sectional view showing additional terminals embedded in the band.

DETAILED DESCRIPTION

Various embodiments of the present invention are described hereinafter with reference to the figures. It should be noted that the figures are only intended to facilitate the description of specific embodiments of the invention. They are not intended as an exhaustive description of the invention or as a limitation on the scope of the invention. In addition, an aspect described in conjunction with a particular embodiment of the present invention is not necessarily limited to that embodiment and may be practiced in other embodiments. Additional embodiments may be achievable by combining the various elements in different ways. For example, the docking station interface may include magnets that also serve as electric terminals. One or more of the described electronic elements such as a processor and a transceiver may be provided in the base module instead of in the detachable module. Pairs of coupling magnets may be replaced by a single magnet coupled with a corresponding block of magnetically permeable material. Electrical terminals and compliant electrical terminals may be interchanged at coupling interfaces, or both sides of the interface may comprise compliant terminals.

In some contexts it may be beneficial to provide a releasable module attachable to a wearable docking station using magnets.

In some contexts it may be beneficial to provide a convenient "snap on-snap off" method employing magnets for providing a direct physical connection between a detachable or releasable module and a wearable docking station, and also between the releasable module and other releasable modules as well as other devices. The method may further provide for automatic alignment of corresponding contacts of the two mated parts.

In some contexts it may be beneficial to employ a coupling method between a releasable module and other devices wherein no tools are required.

In some contexts it may be beneficial to employ a coupling configuration between a releasable module and other devices wherein no cables are required.

In some contexts it may be beneficial to provide both wireless and direct connect communications between a releasable module and a servicing device. For example, a mobile phone may be the servicing device and it may be coupled with a detachable module wherein data is communicated between the devices using wireless means while charging current flows between them using the direct connection of physical terminals.

Figure 1:
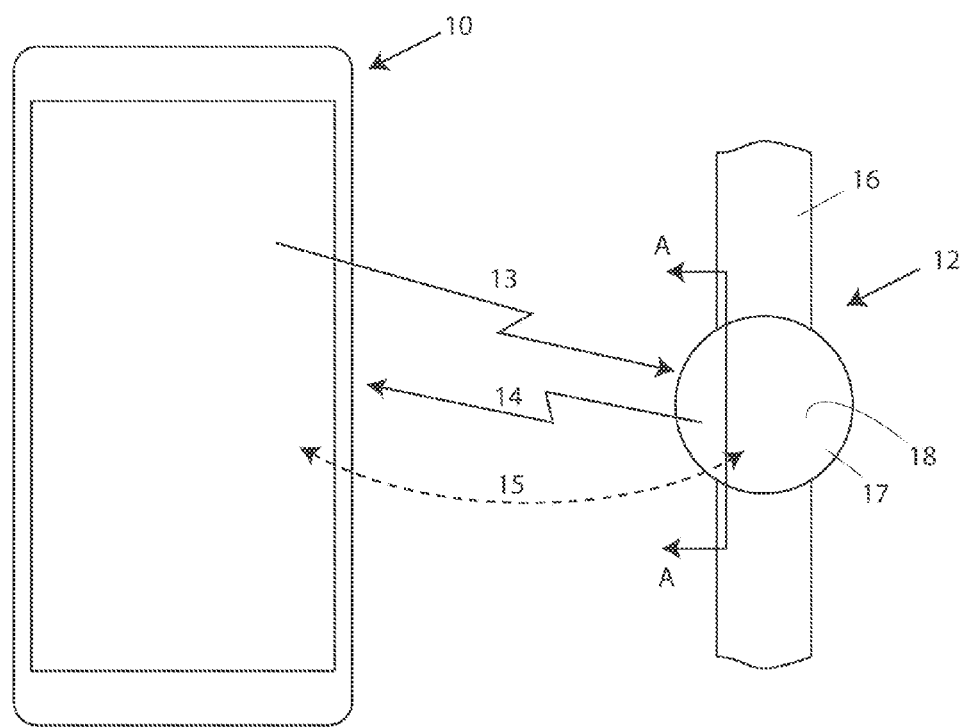
FIG. 1 is a schematic top view showing multiple communications paths between a mobile device and a wearable device.

FIG. 1 schematically depicts multiple communication paths between a mobile device 10 and a wearable device 12. A first communication path 13 comprises a wireless connection from mobile device 10 to wearable device 12; this path may be used for wirelessly passing on messages sent to the mobile device for example, and a protocol such as BLUETOOTH may be employed. A second communication path 14 comprises a wireless connection from wearable device 12 to mobile device 10; this path may be used to inform the mobile device as to what action is to be taken with regard to an incoming message arriving at the mobile device for example. An advantage of using the wearable device rather than the mobile device to make this determination may be that the associated user action is less objectionable to a third party such as a person in current conversation with the user, or participants in a business meeting. A third communication path 15 comprises a direct physical connection between wearable device 12 and mobile device 10, and this path may be bi-directional; it may be used for servicing the wearable device for example. Servicing may include syncing the wearable device with the mobile device, or charging the wearable device using energy stored in the mobile device, or creating or amending a trusted pair relationship between the two devices as examples. Charging of wearable device 12 may also be accomplished using a docking station equipped with a copy of a contact array to be further described, and suitably configured to transfer energy to the wearable device. Wearable device 12 may comprise an adjustable band 16 which may attach to a user's wrist for example. Other locations such as a user's upper arm, chest, or ankle may also be used. A releasable module 17 may attach to band 16 as shown, and module 17 may have a viewing face 18 on which images may be displayed.

Figure 2A:
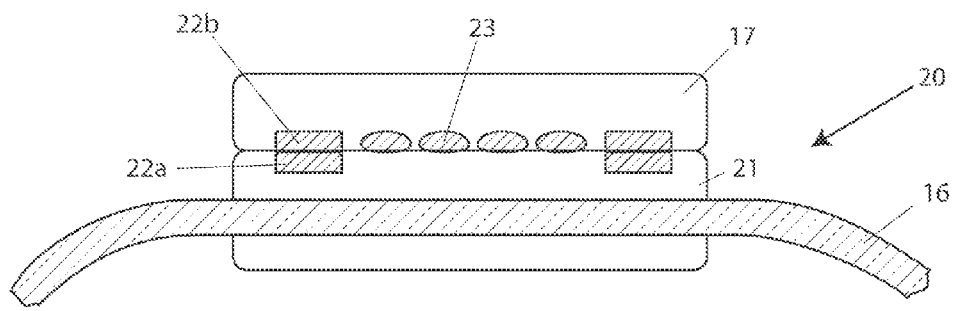
FIG. 2A is an expanded cross-sectional view corresponding to section AA of FIG. 1.

FIG. 2A shows an expanded cross-sectional view of releasable module 17 attached to a base 21 which further attaches to band 16 of FIG. 1. Band 16 and base 21 may be rigid or flexible. Magnet 22a is an attachment magnet embedded in base 21. Magnet 22b is a module magnet embedded in module 17, and corresponds spatially and opposes magnet 22a. Attraction between magnet pairs such as 22a and 22b provides an attractive coupling force between component pairs such as base 21 and releasable module 17. Module 17 further comprises compliant contacts 23, to be further described. Base 21 represents one version of a docking station, alternate versions will be further described.

Figure 2B:
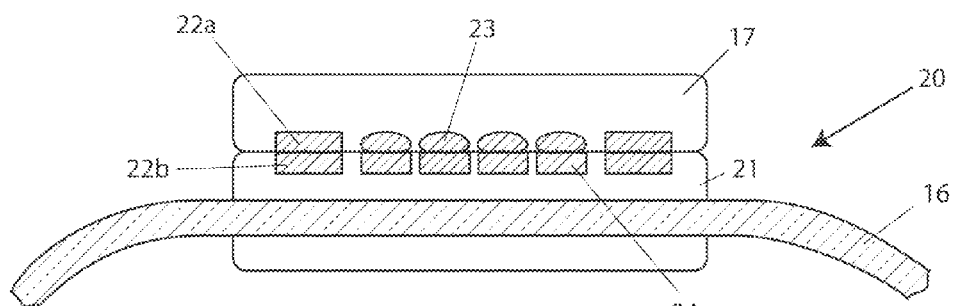
FIG. 2B is an expanded cross-sectional view showing additional terminals embedded in the base.

FIG. 2B shows that base 21 may further comprise terminals 24 that spatially correspond with compliant terminals 23. This embodiment may be used when a processor providing electronic intelligence is included in base 21, to be further described.

FIG. 3A illustrates in cross-section an alternative embodiment wherein base 21 and band 16 of FIG. 2 are combined into a docking station 30 comprising a single integrated component consisting of band 16 and attachment magnets such as 31. The attachment magnets may be embedded in band 16 as shown. Releasable module 17 is the same as depicted in FIG. 2A. Embodiment 30 typically will have a lower profile than embodiment 20 depicted in FIG. 2, and this may be preferred by users.

FIG. 3B again shows that base 21 may further comprise terminals 24, spatially corresponding with compliant terminals 23.

Figure 4A:
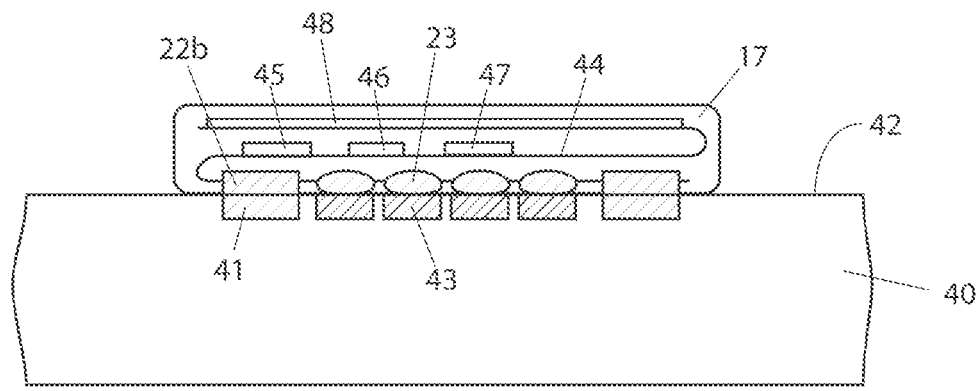
FIG. 4A is an expanded cross-sectional view of a wearable module comprising a display attached to a servicing device.

FIG. 4A depicts in cross-section an attachment of wearable module 17 to a servicing device 40 using module magnets such as 22b in the detachable module 17 and magnet 41 which may be embedded in the surface 42 of servicing device 40. Alternatively, magnets such as 41 may be embedded in a protective cover provided with servicing device 40. Servicing device 40 may be a secondary device such as a charger, or it may be a mobile device of a user such as a mobile phone. When module 17 snaps on to servicing device 40, it can be seen that the parts automatically align. This enables effective contact between pairs of compliant terminals such as terminal 23 of module 17 and corresponding terminal 43 of servicing device 40. Terminal 43 may be a rigid terminal such as a conductive disk as shown, or a compliant terminal such as molded conductive rubber. The terminals are used as electrical contacts for conveying signals between the devices. Compliant terminals 23 preferably compress on contact such that they make good electrical contact with their opposing terminals 43 while allowing the coupling magnets 22*b* and 41 to maintain intimate contact. The magnets may further be utilized as current carrying terminals. Other types of compliant contacts may be used, such as a deflectable metal dome or clip for example. Module 17 preferably includes a flexible printed circuit 44 with attached integrated circuit chips such as a processor 45, a memory 46, and may include a transceiver 47 as shown. Memory 46 is encoded with instructions executable by processor 45 to generate display signals. Display 48 is provided to display content corresponding to the display signals. Printed circuit 44 may also connect with magnets and compliant terminals as shown in the figure, providing interconnections between selected input/output pads of the integrated circuit chips and selected terminals such as compliant terminals or magnets.

Figure 4B:
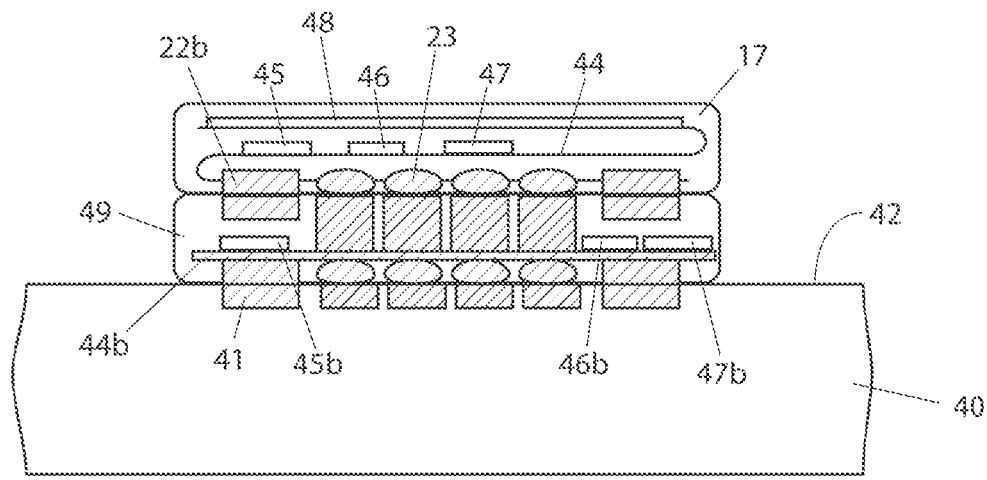
FIG. 4B is an expanded cross-sectional view showing a stacked arrangement including two detachable modules.

FIG. 4B depicts a stacked arrangement of wearable modules, including module 17 described in reference to FIG. 4A, and module 49. Module 49 may include printed circuit board 44*b* as shown, together with a processor chip 45*b*, memory chip 46*b*, and preferably a transceiver chip 47*b*. Compliant terminals are provided at the bottom (rear) of both module 17 and module 49 and connect with corresponding opposing terminals as shown. Other stacked arrangements may be employed, including multiple detachable modules. Typically a module containing a display is configured on top of the stack as shown in FIG. 4B.

Figure 5:
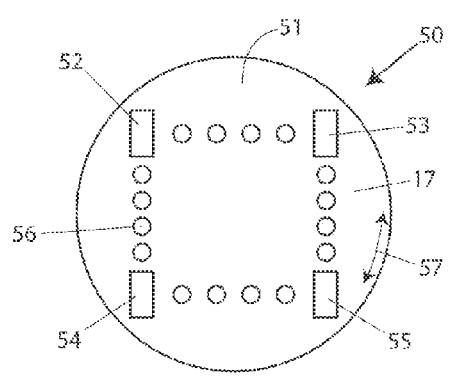
FIG. 5 is a top view of a standardized contact array provided on the rear face of the wearable module.

FIG. 5 is a top view of the contact array 50 in bottom face 51 of wearable module 17 comprising magnets 52-55, and compliant terminals such as 56. An example of a suitable arrangement of the magnet poles is shown. A module periphery 57 is shown near the boundary of wearable module 17, and periphery 57 defines a module area.

Figure 6:
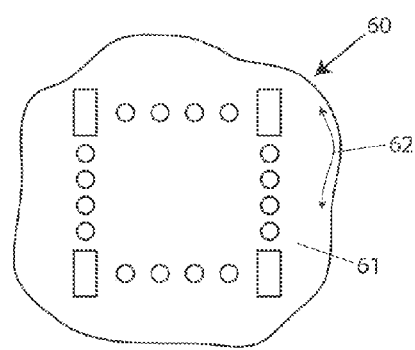
FIG. 6 is a top view of a matching contact array provided on an exposed face of the servicing device.

FIG. 6 depicts contact array 60 embedded in a wearable device for example. The periphery 62 of the wearable device is shown, and periphery 62 defines a device area. The device area defined by periphery 62 is independent of the module area defined by periphery 57 of FIG. 5. Contact array 60 is an identical copy of contact array 50 of FIG. 5. Contact array 60 may be used in an exposed face of servicing device 40 and in any other device to which module 17 may desirably be connected, wherein transmittance of signals involving direct physical contact is required. A version of contact array 60 that excludes the compliant terminals may be used at a docking station such as 30 of FIG. 3A, wherein releasable capture of the wearable module is desired but direct signal transmittance is not required. It can be seen that when contact array 50 of FIG. 5 is flipped to mate with contact array 60 of FIG. 6, opposite magnet poles are in contact, providing the desired coupling force between the parent devices.

Figure 7:
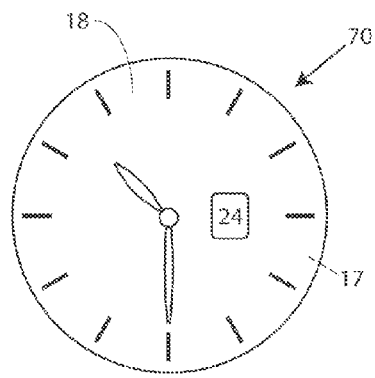
FIG. 7 is a top view of the wearable module showing a programmed image comprising an analog watch face.

FIG. 7 illustrates a programmed background image 70 on viewing face 18 of wearable module 17. Image 70 depicts an analog watch face which a user may refer to for telling time, in the absence of messaging activity or other desired user interaction. Image 70 may be created using programmed instructions encoded in memory 46, executed by processor 45 and displayed on display 48 of FIGS. 4A and 4B. Other background images may be presented according to user preference. When coupled to a suitable vibrator, processor 45 may also execute instructions to create a silent vibratory alert to the user when needed.

Figure 8:
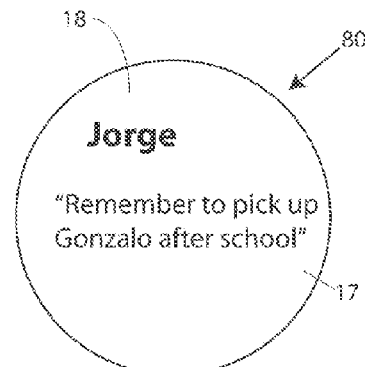
FIG. 8 is an alternative top view of the wearable module comprising a programmed textual image which provides an alert to the user.

FIG. 8 depicts an alternative image 80 presented on viewing face 18 of wearable module 17. Image 80 depicts a textual alert to the user as shown. Many other images may be used for a wide variety of purposes, as may be envisioned by a practitioner of the art.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art. For example, the principles have been described in the context of a watch-like module that attaches to a user's wrist. Other points of attachment may be used. The principles described may be applied to any wearable electronic module that may be temporarily attached to a surface comprising a standard contact array as described herein.

What is claimed is:

1. A wearable device comprising:
    a band attachable to a user;
    a base attachable to the band wherein the base comprises attachment magnets;
    a detachable module comprising:
    a first set of module magnets having spatial orientation corresponding to the attachment magnets of the base and disposed on a first face of the detachable module, wherein the first set of module magnets are coplanar with the first face of the detachable module;
    a first set of compliant terminals disposed on the first face of the detachable module, wherein the first set of compliant terminals are configured to compress upon contact with the base;
    a processor;
    a memory coupled to the processor wherein the memory is encoded with instructions that are executable by the processor to perform tasks such as interpreting received communication signals, generating sent communication signals, and generating related alerts to a user; and,
    a transceiver for receiving the received communication signals and sending the sent communication signals.

2. The wearable device of claim 1 wherein the base further comprises a set of terminals having spatial orientation corresponding to the first set of compliant terminals.

3. The wearable device of claim 1 wherein the detachable module further comprises a display for displaying content of display signals, and the memory coupled to the processor is encoded with additional instructions for providing the display signals.

4. The wearable device of claim 3 wherein the display is disposed on a second face of the detachable module opposing the first face of the detachable module.

5. The wearable device of claim 1 wherein the band attachable to the user and the base attachable to the band are provided in a single docking component comprising attachment magnets.

6. The wearable device of claim 1 wherein a periphery of the wearable device defines a device area, a periphery of the detachable module defines a module area, and the module area is independent of the device area.

7. A stacked wearable device comprising:
    a band attachable to a user;
    a base attachable to the band wherein the base comprises attachment magnets;
    a first detachable module comprising:
    a first set of module magnets having spatial orientation corresponding to the attachment magnets of the base and disposed on a first face of the first detachable module, wherein the first set of module magnets are coplanar with the first face of the first detachable module;

a second set of module magnets having spatial orientation corresponding to the attachment magnets of the base and disposed on a second face of the first detachable module opposing the first face of the first detachable module;

a first set of compliant terminals disposed on the first face of the first detachable module, wherein the first set of compliant terminals are configured to compress upon contact with the base;

a second set of terminals having spatial orientation corresponding to the first set of compliant terminals and disposed on the second face of the first detachable module;

a processor;

a memory coupled to the processor wherein the memory is encoded with instructions that are executable by the processor; and, a transceiver for receiving and sending communication signals;

a second detachable module stackable with the first detachable module comprising:

a third set of module magnets having spatial orientation corresponding to the attachment magnets of the base and disposed on the first face of the second detachable module;

a third set of compliant electrical terminals having spatial orientation corresponding to the first set of compliant terminals of the first detachable module and disposed on the first face of the second detachable module;

a second processor;

a second memory coupled to the second processor wherein the second memory is encoded with instructions that are executable by the processor to provide display signals; and, a display for displaying content of the display signals.

8. The stacked wearable device of claim 7 wherein the band attachable to the user and the base attachable to the band are provided in a single docking component comprising attachment magnets.

9. A method for organizing a user's electronic equipment, the method comprising:

providing a docking station wearable by the user;

attaching a releasable module to the docking station, the releasable module being attached to the docking station by magnets coplanar with an attachment face of the releasable module, the releasable module including at least one compliant terminal configured to compress upon contact with the docking station;

providing wireless communications between a mobile device of the user and the releasable module;

acting on wireless communications passing between the mobile device of the user and the releasable module; and, periodically servicing the releasable module by separating it from the docking station and attaching it to a secondary device for service operations, then reattaching it to the docking station for continued operations.

10. The method of claim 9 wherein the secondary device comprises a secondary mobile device.

11. The method of claim 9 wherein the service operations comprise charging the releasable module.

12. The method of claim 9 wherein the service operations comprise syncing the releasable module with the mobile device of the user.

13. The method of claim 9 wherein the service operations comprise establishing or amending a trusted pair relationship between the mobile device of the user and the releasable module.

14. The method of claim 9 wherein the service operations comprise data transfer between the mobile device of the user and the releasable module.

15. The method of claim 9 wherein the docking station comprises magnets.

16. The method of claim 15 wherein the attaching of the releasable module to the mobile device comprises:

bringing the devices together with matching faces in proximate alignment; and, snapping the components together using the attractive force of the magnets.

* * * * *